United States Patent [19]

Strelets et al.

[11] E Re. 28,829

[45] Reissued May 25, 1976

[54] FUSED SALT ELECTROLYZER FOR MAGNESIUM PRODUCTION

[76] Inventors: Khaim Lipovich Strelets, ulitsa Furmanova, 19, kv. 2; Alexandr Sergeevich Chesnokov, Schastlivaya ulitsa, 9, kv. 28, both of Leningrad; Vladimir Nikolaevich Devyatkin, prospect Lenina, 43, kv. 9, Berezniki, Permskoi oblasti; Alexandr Nikolaevich Tatakin, ulitsa Gornyaka, 13, kv. 3, Solikamsk; Evsei Dmitrievich Krasikov, Slavyansky bulvar, 3, kv. 51, Moscow; Ljudmila Sergeevna Leonova, ulitsa Lomonosova, 105, kv. 151; Galina Arkadievna Medvetskaya, ulitsa Lva Tolstogo, 68, kv. 53, both of Berezniki; Tatyana Georgievna Nechaeva, ulitsa Mira, 42, kv. 73, Solikamsk, all of U.S.S.R.

[22] Filed: July 11, 1974

[21] Appl. No.: 487,630

Related U.S. Patent Documents

Reissue of:

[64] Patent No.: 3,676,323
Issued: July 11, 1972

Appl. No.: 96,835
Filed: Dec. 10, 1970

[52] U.S. Cl. ..... 204/244; 204/70; 204/245; 204/272

[51] Int. Cl.[2] ..... C25C 3/08; C25C 3/04

[58] Field of Search ..... 204/70, 243–247, 204/272

[56] References Cited

UNITED STATES PATENTS

| | | | |
|---|---|---|---|
| 3,396,094 | 8/1968 | Sivilotti et al. | 204/70 |
| 3,580,835 | 5/1971 | Peterson | 204/70 X |

FOREIGN PATENTS OR APPLICATIONS

| | | | |
|---|---|---|---|
| 238,791 | 3/1972 | U.S.S.R. | 204/243 R |

*Primary Examiner*—Howard S. Williams
*Assistant Examiner*—Aaron Weisstuch
*Attorney, Agent, or Firm*—Holman & Stern

[57] ABSTRACT

An electrolyzer for the manufacture of magnesium, which has at least one electrolysis compartment with a cathode in the form of a frame whose members make up a closed loop around an anode in the electrolysis compartment.

5 Claims, 3 Drawing Figures

FUSED SALT ELECTROLYZER FOR MAGNESIUM PRODUCTION

Matter enclosed in heavy brackets [ ] appears in the original patent but forms no part of this reissue specification; matter printed in italics indicates the additions made by reissue.

The present invention relates to electrolyzers for the manufacture of magnesium.

Known in the art are electrolyzers for the manufacture of magnesium, comprising two compartments for the electrolysis of magnesium chloride, between which is placed a compartment to collect metallic magnesium. Between the electrolysis compartments and the collecting compartment there are partitions fabricated from refractory materials. The electrolysis compartments hold electrodes. Cathodes are provided in the form of plates with rods passing through a lining to a busbar.

However the above-mentioned electrolyzer has a low production rate. Attempts to increase the production rate of the electrolyzer by enlarging the electrolysis compartments reduce the current efficiency and entail increased power consumption per unit of the quantity of metal product. Attempts to improve the production rate of the electrolyzer by increasing its length results in requirement of extra shop floor area and inconveniences in servicing. The multitude of cathodes, with each cathode having a current-conducting connection of its own, passing through the lining, impair the strength of the lining at the fixation points. Another weak point about this type of electrolyzer lies in that the partitions made wholly of a refractory material. These partitions fail at a high rate, resulting in loss of chlorine.

The main object of the present invention is to eliminate the above-mentioned disadvantages. Other aims and advantages of the invention will become more fully apparent from the following description.

The object of the present invention is to provide an electrolyzer which offers a greater production rate, a high output of metal per unit area, improved utilization of the working volume, and simplified servicing, and has a reduced power consumption, fewer current-conducting connections built into the lining and an extended service life.

This objective is accomplished by providing an electrolyzer for the manufacture of magnesium, which, according to the invention, has at least one electrolysis compartment with a cathode in the form of a frame whose members form a closed loop around an anode in that compartment.

An electrolyzer of this type has a greater production rate.

It is expedient to make the members of the cathode (frame) in the form of walls and place the longitudinal walls between the electrolysis compartment and the collecting compartment in such a way that they constitute the lower portion of a partition. With this construction, it is seen that the output of metal per unit area is increased.

It is further preferable that the thickness of the longitudinal members of the cathode be made to increase towards the current-carrying connection. This improves the operation of the electrolyzer and provides a more uniform distribution of current in the cross members of the cathode frame.

A greater production rate is obtained if the frame-shaped cathodes are installed in at least three electrolysis compartments with at least two collecting compartments provided in between.

In a cell with three electrolysis *compartments* the electrode in the middle compartment may be about twice as wide as the electrode in the outer electrolysis compartments. Thus better use is made of the operational area of an electrolyzer.

For a better understanding of the invention reference will now be made to a preferred embodiment according to the invention and the accompanying drawings, wherein.

Figure 1:
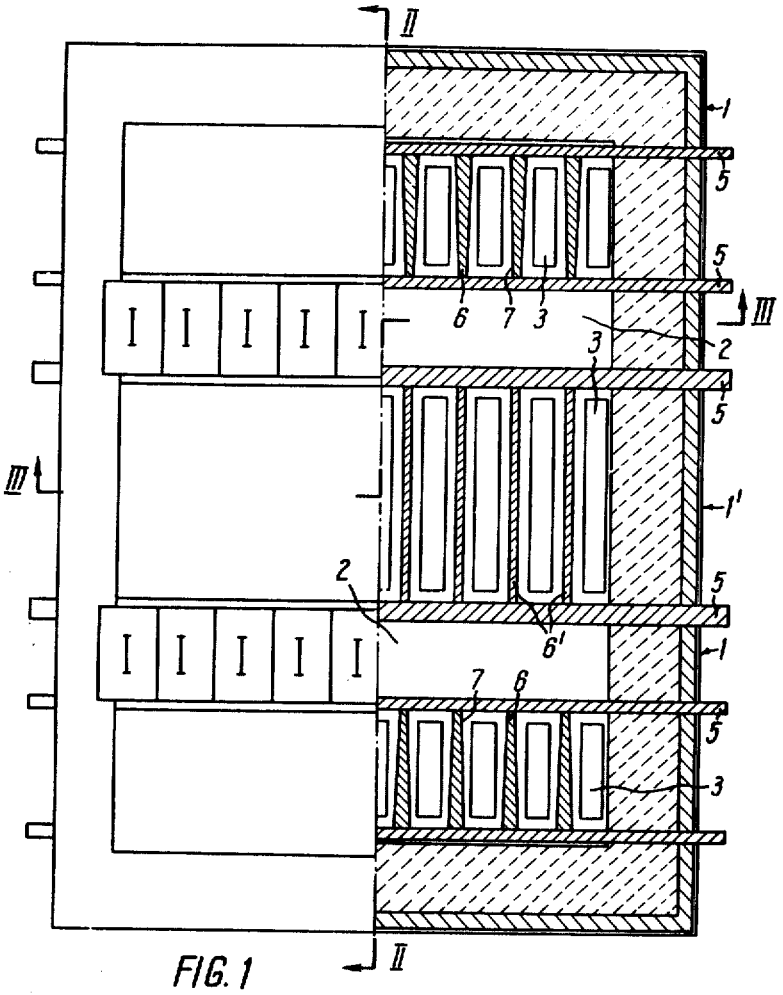
FIG. 1 shows a cut-away view of an electrolyzer in plan, according to the invention.
Figure 2:
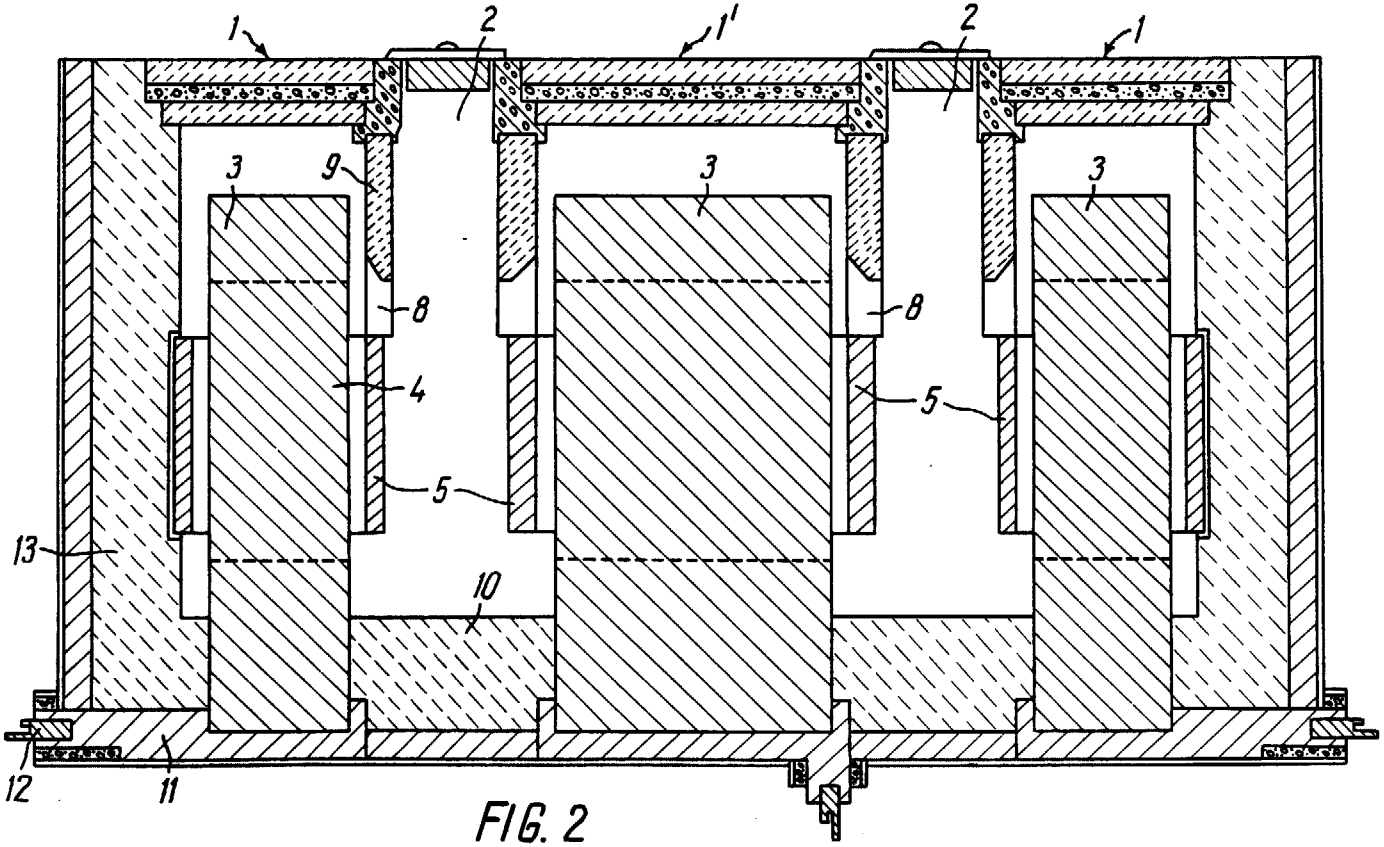
FIG. 2 shows vertical cross section II—II through the electrolyzer of FIG. 1.

Referring to FIG. 1, the electrolyzer has two outer electrolysis compartments 1 and one middle electrolysis compartment 1', between which are placed compartments 2 (FIG. 2) for collection of metallic magnesium and slime. The electrolysis compartments 1 and 1' hold graphite anodes 3 and cathodes 4, said cathodes being in the form of a frame or a closed loop, each loop consisting of two longitudinal members 5 and several cross members 6. The width of the longitudinal members 5 decreases in the direction away from the current-conducting connection, which fact provides for a more uniform distribution of current in the cross members 6 of the cathode frame.

Figure 3:
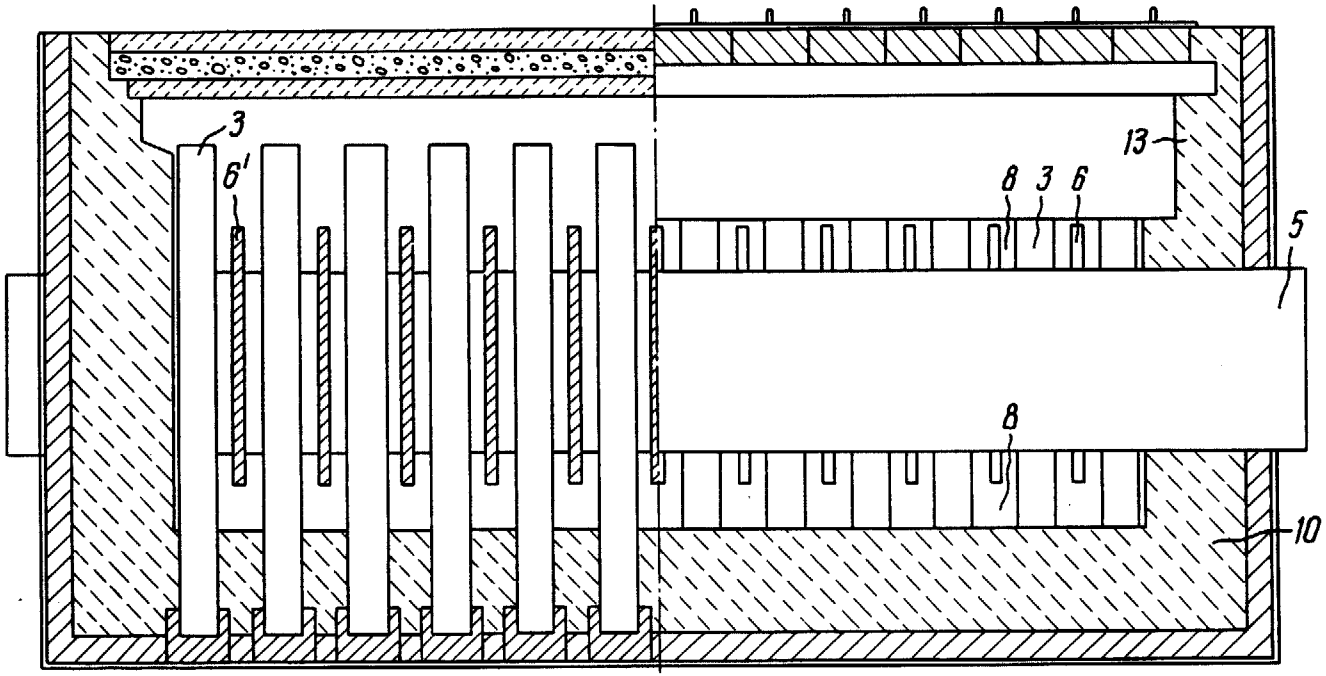
FIG. 3 shows vertical longitudinal section III—III through the electrolyzer of FIG. 1.

For directed circulation of the electrolyte and better transfer of the metal (magnesium) from the electrolysis compartments into the collecting compartments, the cross members 6 of the cathode frames (which are the main working surfaces of the cathodes) have bevelled portions 7 which increase the interelectrode distance in the direction of the collecting compartments 2. The electrolysis compartments 1 and 1' are placed in communication with the collecting compartments 2 by top and bottom slots 8 (FIG. 3) in the partitions whose upper parts 9 (FIG. 2) are made of a refractory material. The lower portion of each partition is also one of the longitudinal members 5 of the cathode frame. The middle electrolysis compartment 1' and the electrodes located in the compartment are respectively twice as wide as the outer compartments 1 and their electrodes. The anodes are embedded in the brickwork of the electrolyzer bottom 10. Current to the anodes is conducted from beneath, through a cast-iron contact slab 11 and an aluminum shank 12. The longitudinal members of the cathode frames extend through the electrolyzer lining 13 to a d.c. source.

The electrolyzer operates as follows. The bath is filled with an electrolyte consisting of molten chlorides of alkaline and alkaline earth metals to a level covering the slots 8 in the partitions. Then direct current is applied to the electrodes, and the electrolysis of the magnesium chloride begins. The result is that magnesium and chloride are liberated at the respective electrodes. The operation is carried on at an electrolyte temperature of 680°–730° C. The electrolyte rises to the surface and carries the magnesium and chlorine along; the chlorine leaves the electrolyte and collects at the top of the electrolysis compartment. Chlorine removal rom the electrolyzer is effected through a port in the op cover of the electrolyzer. The metal-electrode nixture freed from chlorine flows from the electrolysis :ompartments through the slots 8 in the lower protion of the partition into the collecting compartment. The nagnesium metal collects at the top of the collecting :ompartment, while the electrolyte flows through the ower portion of the partition back into the electrolysis compartment. In this way, there is a closed flow of electrolyte providing for continuous transfer of the metal from the electrolysis compartments into the collecting compartment. In the outer electrolysis compartments 1 the closed flow of electrolyte carries the metal in one direction, towards the collecting compartment. In the middle electrolysis compartment, located between two collecting compartments, a closed flow of electrolyte carries the metal in opposite directions, into the two collecting compartments. Therefore, the conditions for the transfer of the metal from the middle electrolysis compartment which is nearly twice as long as the outer ones are the same as for the transfer from the outer compartments.

In the electrolysis compartment the spacing between the electrodes gradually increases in the direction of the collecting compartments. Therefore, the cell area farthest from the collecting compartments have an increased current density and a maximum gas content in the electrolyte, which factors provide for directed circulation of the electrolyte essential to the transfer of the metal to the collecting compartments across the entire width of the electrolysis compartments.

The metal is removed from the collecting compartments at regular intervals, as it collects there. The slime from the electrolyte settling at the bottom is also removed periodically.

The electrolyzer described above has been tested. The energy consumption has been 12.5 kWh per kilogram of magnesium, which is 20 to 25 percent less than in the case of other existing electrolyzers.

In other embodiments of the proposed electrolyzer, the longitudinal members of cathode frames may be of uniform cross-section along their entire length. Variations in the electrode spacing in the electrolysis compartment can be obtained by using anodes with bevelled faces in the direction of the collecting compartments. Also, current to the anodes may be supplied from above.

What is claimed is:

1. An electrolyzer for the manufacture of magnesium, comprising in combination: at least three electrolysis compartments housing electrodes; and at least one magnesium collecting compartment located between said electrolysis compartments each of the electrolysis compartments having a plurality of anode members and a cathode in the form of a frame whose members form a closed loop around each anode member in said electrolysis compartment.

2. An electrolyzer, as claimed in claim 1, which includes partition walls between electrolysis compartments and collecting compartments and in which said cathode members comprise longitudinal members which are made in the form of walls which form a lower portion of the partition walls.

3. An electrolyzer, as claimed in claim 2, in which the thickness of said longitudinal cathode members increases in the direction of the current-conducting connection thereof.

4. An electrolyzer, as claimed in claim 1, having three said electrolysis compartments, in which an electrode located in the middle electrolysis compartment is substantially twice as wide as the corresponding electrodes located in the outer electrolysis compartments.

*5. In an electrolytic cell for melt-electrolytic production of magnesium, comprising electrolysis and collecting compartments, said electrolysis compartment containing cathodes and anodes, the improvement comprising each of said cathodes consisting of two longitudinal members and a plurality of transverse members, said members forming a closed frame around at least one anode in said electrolysis compartment.*

* * * * *